Oct. 14, 1941.  A. B. WILLI  2,258,834
REAR MAIN BEARING SHELL FOR INTERNAL COMBUSTION ENGINES
Filed Aug. 28, 1939
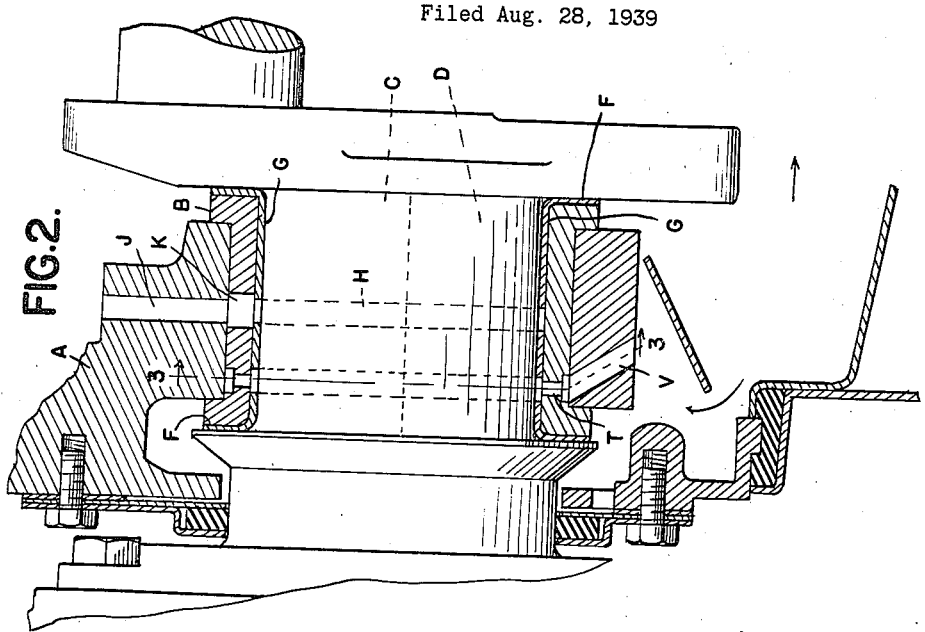
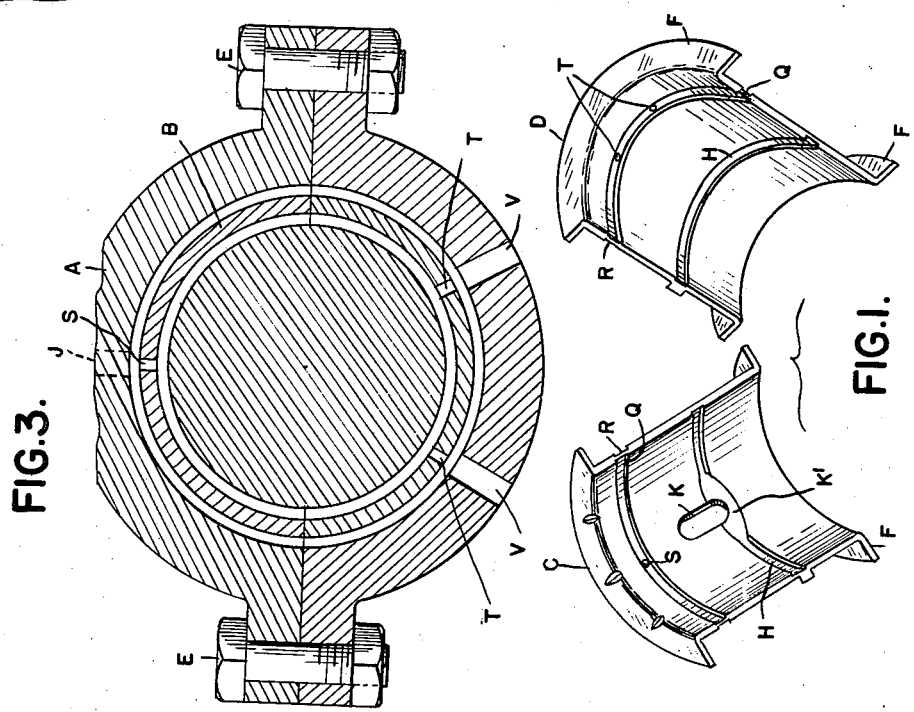
INVENTOR.
ALBERT B. WILLI
BY
ATTORNEYS Patented Oct. 14, 1941

2,258,834

UNITED STATES PATENT OFFICE 2,258,834

REAR MAIN BEARING SHELL FOR INTERNAL COMBUSTION ENGINES

Albert B. Willi, Grosse Pointe, Mich., assignor to Federal-Mogul Corporation, Detroit, Mich., a corporation of Michigan Application August 28, 1939, Serial No. 292,211

6 Claims. (Cl. 308—240)

This invention relates to an improved rear main bearing construction for motor vehicles, and has for its object the reduction in the oil leakage rate therefrom, which has seemed to be a necessary evil in connection with constructions of the character, because of the primary necessity of maintaining within the housing a sufficient quantity of oil to protect the thrust faces of the bearing from wipeage and similar impairing wear. Previous constructions designed to counteract this objection have failed to take into account the relative and opposing pressures, due on the one hand to internal oil pressure within the bearing and in the opposite direction from crankcase pressure caused by movement of the pistons, blow-by of explosions past the piston rings etc. The problem here dealt with concerns the provision of a journal bearing whose construction adequately cares for both of these features, bearing in mind that the central and necessary operative result to be obtained is the maintenance of an efficient film of lubricant upon the thrust portions of the bearing particularly.

In the drawing:

Figure 1 is a perspective of two half-bearing units, embodying my improved constructional features, shown in such spread-out relation to one another that their internal or concave surfaces are displayed.

Figure 2 is a sectional elevational view, showing a journal bearing composed of two such half-bearing units installed in a rear main bearing housing.

Figure 3 is a sectional elevational view taken along the line 3—3 of Figure 2, and looking in the direction of the arrows there shown.

Although the improvements here dealt with are applicable both to whole bearings and half-bearing installations, the present detailed discussion is particularly directed to the constructional features and parts involved where complementary half-bearing shells are used, though no departure of consequence is encountered where the bearing shell is a fully circular one. Either form is adapted to be supported by the frame A surrounding the bearing housing B of an internal combustion engine, whose parts are held in compressed relation by the usual bolts E. In the form herein illustrated, the unit C is the upper half-bearing shell and the unit D is the lower half-bearing shell, each terminally flanged as at F, and provided with the usual babbitted facing G.

At J is shown the oil lead passage through the housing, and in registry with this is the preferably elliptical wall-penetrating hole K in the upper half-bearing unit C, through which lubricating oil is fed to the babbitted surfaces of the bearing, the even distribution of the oil thereover being facilitated by the internal groove H which is intersected by the hole K, and which is present in both the upper half-bearing shell C and the lower half-bearing shell D. If desired, a cutting away of the shell wall adjacent the hole, as at K', may be provided to facilitate the inflow of the oil from the oil feed source onto the bearing surface.

Spacedly located on the bearing shells, in Figure 2, at the left of the groove H just described, are a pair of substantially registering grooves Q and R, on the internal and external surfaces respectively of the walls of both the upper unit C and lower unit D. At the top of the upper half-bearing unit C a wall-traversing hole S is located, thus connecting the grooves Q and R, and at or near the bottom of the lower half bearing unit D are provided a pair of escape apertures T in the grooves Q and R which are in registry with the drain back passages V leading to the oil pan, through which excess oil is evacuated. These apertures T and their corresponding drain back passages V should be, as brought out in Figure 3, approximately 60° apart, so that the non-draining portion of the groove Q will allow a metered quantity of oil to pass, just enough to lubricate the thrust flange and the bearing between the thrust flange and the groove Q.

If the fit of the shaft in the bearing thus constituted is so accurate that the oil supply furnished through the oil lead passage is no more than sufficient to adequately serve the bearing, there is, of course, no question of undue oil leakage to be dealt with. If, however, under long or exacting conditions of use, an excess clearance of only a few thousandths of an inch develops between the shaft and its surrounding bearing surface, the objectionable oil leakage begins. On the other hand, the necessity for an efficient lubrication of the babbitted bearing surface continues, particularly the terminal thrust surfaces.

The function of the collector groove Q therefore is to afford the communication of crankcase pressure, fed through the registering apertures T and V, to the excess and otherwise escaping oil, counteractive of the feeding pressure thereon exerted through the aperture J and bearing shell hole K. Thanks to this backward pressure also proceeding through the grooves Q and R and the hole S, there is a substantial equality or balance of pressure in these parts against the oil feed pressure. The crankcase pressure due to piston movement, blow-by, etc., acts in all directions made available to it through the various described passages and holes, and unless and until an excess of oil begins to accumulate in the collector groove Q, no leakage of oil can begin; and when it begins, its escaping flow is counteracted by the crankcase pressure.

It will be noted that with the bearing shell parts as thus described, positioned in the manner shown in Figures 2 and 3 particularly, such of the crankcase-contained space as is not occupied either by the bearing shell walls or by the engine shaft consists of these two carefully inter-related and to a degree conteractive groove spaces and their connecting holes, through one of which, as for example, in the passage J, such spaces are subject to the constant oil pressure intentionally provided as part of the engine's construction, which pressure is resisted by the crankcase pressure due to piston movement and blow-by, which has access to the housing through the passage T and drain channel V. Thus if the oil pressure through the passage J and its connection with the groove H has not been of such a degree as to fill the collector groove Q, the crankcase pressure continues to function to keep it clear by reason of the opposing entering pressure. If, however, oil collects in the groove Q, resulting from an excess pressure from the force feed mechanism, the temporary superiority of pressure derived therefrom results in a flow of the excess oil out through the drain hole V and passage T. Since, however, the only intended effect sought from the permitted excess of crankcase pressure into the several grooves mentioned is to prevent an excess of oil, the functioning of the oil feed mechanism should usually be somewhat superior to the crankcase pressure to the degree of keeping the thrust surfaces of the bearing adequately lubricated against crankshaft thrust.

The comparative ease of installation of the above described construction, as well as the efficiency of its working in thus maintaining a balance against undesired pressure in either direction, will thus be obvious; and while, for example, this construction has been described as having to do with two mated half-bearings, it will be obvious that the same operative principles would prevail in the case of an installed fully circular bearing unit, and this disclosure is intended to be construed accordingly.

What I claim is:

1. A bearing shell adapted for lodgement in a housing whose wall is traversed by passages connected with the crankcase and with the oil lead respectively of an internal combustion engine, the concave surface of said shell being provided with a pair of grooves and the convex surface of said shell being provided with a single groove in substantial registry with one of said first-mentioned grooves and connected therewith by a wall-traversing aperture, and the other of the grooves on the concave surface of the shell being also provided with a wall-traversing aperture adapted for positioning in operative proximity to the oil lead passage in the housing while the apertures connecting the specified registering grooves are located at the positioned bottom portion of the bearing shell in approximately 60° spaced relation to one another for registry with the recited and correspondingly positioned apertures in the housing, whereby the bearing as a whole is rendered subject to an approximately balanced pressure as regards the otherwise oil-filled spaces provided by its contourings.

2. In combination with a bearing housing for the shaft of an internal combustion engine whose walls are traversed by passages leading to the oil pressure system and to the crankcase respectively, removable complementary bearing shell units therefor, each provided with a single grooving on its convex face and with a plurality of groovings on its concave face, one of the latter being in position of substantial registry with the former and connected therewith by a wall-traversing aperture adapted to be located in operative propinquity to the oil lead passage in the housing, and the other one of the groovings on the concave surface of the bearing shell assembly being provided with a wall-traversing aperture adapted to be located operatively adjacent the oil lead passage, said registering grooves also being provided in the lower positioned bearing shell unit with a pair of peripherally spaced apertures which register with correspondingly located drain passages in the lower portion of the bearing housing, whereby the supply of oil maintained within the bearing structure is subjected to the mutually opposing pressures from the oil feed system of the engine and from the crankcase thereof.

3. A marginally flanged bearing shell having a single groove located on its outer surface and a plurality of grooves on its inner surface, one of the latter being located in substantial registry with the position of the single groove on the outer periphery and being connected therewith by a hole through the thus reduced shell wall thickness, the positioned lower portions of said registering grooves also having a pair of wall-traversing apertures which are peripherally spaced from one another, for registry with correspondingly positioned drain passages in a bearing housing, for effecting a substantial equality of pressure therewithin under operative conditions, the shell wall being also perforated in the other of said grooves at a point substantially diametrically opposite said first named hole for registry at that point with a pressure access connection with the oil pressure source, while the first named hole is similarly adapted for registry with an oil pressure source.

4. A complementary pair of bearing shells adapted for installation in a bearing housing for effecting a diminution in the rate of leakage therefrom without detriment to the maintenance of an adequate degree of lubrication for the thrust faces thereof, each of said bearing shells having a pair of spacedly located parallel grooves on its interior surface and a similar single groove on its outer surface positioned in substantial registry with one of the grooves on the interior surface, said last two grooves being connected at the positioned top position of the bearing shell assembly by a wall-traversing hole in one of the bearing shell units which is located operatively adjacent an oil pressure connection and the lower portion of such registering grooves being also provided with a pair of peripherally spaced apertures adapted to register with correspondingly located drain passages in a bearing housing, and the single groove on the concave surface of the shell being provided with a wall-traversing aperture adapted to be positioned in the bearing housing in operative propinquity to an oil pressure source.

5. A bearing shell adapted to serve in the maintenance of a substantially balanced oil pressure within its housing, comprising a cylindrical body provided with terminal outwardly-bent flanges, the intermediate wall portion of said shell being provided with registering circumferential groovings on its convex surface and in its concave surface which are connected by a wall-traversing passage at the top of the shell as functioningly positioned, and a pair of peripherally spaced wall-traversing passages through the subjacently positioned portion of the shell for registry with similarly positioned drain passages in the crankcase, the wall of the shell body being also provided with a further grooving on the concave surface in spaced relation to the previously described groovings and with a wall-traversing aperture through which lubricating oil may be supplied to the shaft-surrounding concave face of the bearing shell.

6. The combination, with a bearing housing for the shaft of an internal combustion engine, said housing having connecting passages to the oil-pressure system and to the crankcase respectively, a pair of removable complementary half-bearing units adapted for positioning therewithin, each of said units being registeringly grooved on its concave face to form a circumferential groove which is traversed by a wall-penetrating passage and which is adapted to contribute to the adequate distribution of lubricating oil over the shaft-engaging concave surface of the bearing shell structure, said half-bearing units being also provided with registeringly positioned external and internal circumferential groovings which are connected at spacedly located points by a plurality of wall-traversing passages whereby the oil normally located therein is rendered subject to variances in pressure conditions prevailing in the oil-inlet connection and in the drain outlet connection, the registering grooves being also provided in their lower portions with peripherally spaced wall-traversing holes which are adapted to register with correspondingly positioned drain passages in the bearing housing.

ALBERT B. WILLI.